(12) United States Patent
Hong

(10) Patent No.: US 11,413,577 B2
(45) Date of Patent: Aug. 16, 2022

(54) SCRUBBER, EXHAUST GAS PURIFICATION SYSTEM COMPRISING SCRUBBER, AND AIR PURIFICATION METHOD

(71) Applicant: Kunliang Hong, Jiangsu (CN)

(72) Inventor: Kunliang Hong, Jiangsu (CN)

(*) Notice: Subject to any disclaimer, the term of this patent is extended or adjusted under 35 U.S.C. 154(b) by 167 days.

(21) Appl. No.: 16/855,369

(22) Filed: Apr. 22, 2020

(65) Prior Publication Data

US 2020/0353412 A1 Nov. 12, 2020

Related U.S. Application Data

(62) Division of application No. 15/106,116, filed as application No. PCT/CN2015/073156 on Feb. 16, 2015, now abandoned.

(30) Foreign Application Priority Data

Dec. 18, 2013 (CN) .......................... 201310698177.9

(51) Int. Cl.
*B01D 53/96* (2006.01)
*C02F 1/48* (2006.01)
*B01D 53/78* (2006.01)
*C02F 1/461* (2006.01)
*B01D 53/79* (2006.01)
(Continued)

(52) U.S. Cl.
CPC .......... *B01D 53/965* (2013.01); *B01D 53/72* (2013.01); *B01D 53/78* (2013.01); *B01D 53/79* (2013.01); *C02F 1/4618* (2013.01); *C02F 1/482* (2013.01); *B01D 2251/102* (2013.01); *B01D 2251/202* (2013.01); *B01D 2257/708* (2013.01); *B01D 2257/7027* (2013.01); *B01D 2258/06* (2013.01); *B01D 2259/818* (2013.01); *C02F 2001/4619* (2013.01); *C02F 2001/46133* (2013.01); *C02F 2001/46138* (2013.01); *C02F 2001/46142* (2013.01); *C02F 2001/46185* (2013.01); *C02F 2001/46195* (2013.01);
(Continued)

(58) Field of Classification Search
CPC .................... C02F 1/4618; C02F 1/482; C02F 2001/46133; C02F 2001/46138; C02F 2001/46142; B01D 53/965; B01D 53/72; B01D 53/78; B01D 53/79; B01D 2251/102; B01D 2251/202; B01D 2257/7027; B01D 2257/708; B01D 2258/06; B01D 2259/818
USPC ....................................................... 423/245.2
See application file for complete search history.

(56) References Cited

U.S. PATENT DOCUMENTS

| | | | |
|---|---|---|---|
| 2003/0164309 A1* | 9/2003 | Nakamura ......... | B01D 53/1493 205/746 |
| 2009/0211919 A1* | 8/2009 | Hegel ...................... | C02F 1/42 205/633 |

FOREIGN PATENT DOCUMENTS

CN 102320684 A * 1/2012 .......... C02F 1/46104

OTHER PUBLICATIONS

CN-102320684-A English Translation (Year: 2012).*

* cited by examiner

*Primary Examiner* — Anita Nassiri-Motlagh
(74) *Attorney, Agent, or Firm* — Rosenberg, Klein & Lee

(57) ABSTRACT

A scrubber, an exhaust gas purification system comprising the scrubber, and an air purification method. The treatment water of the scrubber is plasma electrolytic water. The plasma electrolytic water is obtained after water is electrolyzed. The process of electrolysis is carried out in an (Continued)

electromagnetic water treatment device. The electromagnetic water treatment device comprises a cation exchange film, a water flow passage, at least one positive pole panel, at least one negative pole panel, and a magnetic device.

4 Claims, 2 Drawing Sheets

(51) Int. Cl.
*B01D 53/72* (2006.01)
*C02F 103/18* (2006.01)
(52) U.S. Cl.
CPC .. *C02F 2103/18* (2013.01); *C02F 2201/4617* (2013.01); *C02F 2201/46115* (2013.01); *C02F 2201/48* (2013.01)

SCRUBBER, EXHAUST GAS PURIFICATION SYSTEM COMPRISING SCRUBBER, AND AIR PURIFICATION METHOD

The present application is a divisional application of U.S. application Ser. No. 15/106,116, filed Jun. 17, 2016, which is a U.S. national stage application of International Application PCT/CN2015/073156, filed on Feb. 16, 2015, published on Jun. 25, 2015, as International Publication WO2015/090249. The International Application claims priority of Chinese Patent Application 201310698177.9, filed on Dec. 18, 2013, which is hereby expressly incorporated by reference in its entirety for all purposes.

TECHNICAL FIELD

The present invention relates to a scrubber, an exhaust gas purification system comprising scrubber, and an air purification method.

BACKGROUND OF THE INVENTION

Currently the air pollution is increasingly serious, and the problems of air pollution are to be solved as soon as possible. Currently, air purification technology includes photocatalyst air purification technology, filter sieve air purification technology, activated carbon air purification technology, and plasma air purification technology and so on, but all of them have the problem of limited purification efficiency, and secondary pollution, thereby cannot be widely used in the civil and industry. Currently, there exists scrubber used for the treatment of exhaust gas, but the treatment effect of exhaust gas is not very ideal, and a lot of acid or alkali additives are needed to be added, operation is complex, treatment time is long, and treatment cost is high. It becomes a research focus that develops a scrubber having high air purification effect without need of acid or alkali additives.

SUMMARY OF THE INVENTION

The present application aims to solve the technical problem that the air purification device of the prior arts have low purification efficiency, secondary pollution problem, and need to use a lot of acid or alkali additives, and provides a scrubber, an exhaust gas purification system comprising the scrubber, and an air purification method having high air purification efficiency, without need of acid or alkali additives, having simple operation and using the plasma electrolytic water for treating the exhaust gas.

The present invention provides a scrubber, the treatment water of which is plasma electrolytic water, and the plasma electrolytic water is prepared by the following method: water is electrolysed, and the plasma electrolytic water is obtained.

In the present invention, during the preparation of the plasma electrolytic water, because of a series of complex electrochemical reaction, the redox potential, power of hydrogen, size of water molecules, composition and the existential state of ionic, electrical conductivity and other indicators are significantly changed. After hydrolysis, electrolytic acidic water is obtained nearby the electrolysed positive pole, containing a lot of radical ions, the concentration of $H^+$ is higher than the concentration of $OH^-$, as well as a large number of reactive oxygen free radical, having oxidation. After hydrolysis, electrolytic alkaline water is obtained nearby the electrolysed negative pole, containing a lot of hydroxide ions, the concentration of $OH^-$ is higher than the concentration of $H^+$, as well as a large number of reactive hydrogen, having reduction effect.

In the present invention, according to the common understanding in the art the water is pure water or tap water containing a small amount of minerals, and salts. Wherein, the tap water generally contains a small amount of sodium chloride, magnesium chloride, calcium chloride and other mineral salts.

In the present invention, the water is electrolysed to obtain the plasma electrolytic water, generally according to the common in the art it can be used within 2 or 3 days after being electrolysed, preferably, the water after being electrolysed is immediately used in the scrubber.

In the present invention, the water is electrolysed to obtain electrolytic acidic water or electrolytic alkaline water, or obtain electrolytic neutral water.

Wherein, the oxidation-reduction potential of the electrolytic acidic water is preferably from 800 to 1500 mv; the oxidation-reduction potential of the electrolytic alkaline water is preferably from −800 to −1200 mv.

In the present invention, the water may be electrolysed in a conventional electrolysed water production device.

Preferably, the water is electrolysed in a reactor continuously generating high redox water, such as Chinese patent application having an authorization publication number CN102320684B (the content of which is incorporated herein by reference in its entirety); wherein, the reactor continuously generating high redox water consists of a positive pole, a negative pole, a cation exchange film and an insulating housing, the positive pole and the negative pole are disposed on the inner side in longitudinal direction of the insulating housing with acid and alkali resistances, and high voltage resistance, the two poles are parallel and equidistant, the distance between the positive pole and the negative pole is 2-80 mm; a water inlet and a water outlet are disposed on the both sides of the insulating housing, water is injected into a pipe, water inflows from one end, and outflows from the other end; the water inlet, the negative pole, the cation exchange film, the positive pole and the water outlet are disposed in the longitudinal direction of the insulating housing in turn, the cation exchange film is located in the position parallel to the positive pole and the negative pole and respectively having equal distance from the two pole surfaces; the positive pole and the negative pole are connected to high voltage DC power supply, 100-5000 VDC of DC voltage is applied between the positive pole and the negative pole, to form the reactor continuously generating high redox water.

Wherein, the DC voltage is preferably 3000-5000 VDC.

Wherein, in the reactor, the water outlet is preferably disposed to one or more;

Wherein, material of the positive pole is prepared using selected materials of graphite panel, platinum coating panel, ruthenium and iridium coated titanium panel or titanium panel.

Preferably, the water is electrolysed in an electromagnetic water treatment device; wherein, the electromagnetic water treatment device comprises a cation exchange film, a water flow passage, at least one positive pole panel and at least one negative pole panel, and a magnetic device; the positive pole panel and the negative pole panel are disposed on the water flow passage, and applied an electric field, to electrolyze the solution in the water flow passage; the cation exchange film is disposed inside the water flow passage, is located between the positive pole panel and the negative pole panel, and divides the water flow passage into a first water flow passage and a second water flow passage; the magnetic device is disposed on the water flow passage, to apply a magnetic field perpendicular to the direction of the electric field in the water flow passage.

In the electromagnetic water treatment device, preferably, the magnetic device is several magnetic sheets, and the magnetic sheets are disposed to stick on two relative outer walls of the water flow passage. These sheets are used to apply a magnetic field in the water flow passage, and actually various existing magnetic devices can all be used.

In the electromagnetic water treatment device, preferably, several discharge needles are distributed on the positive pole panel and the negative pole panel.

In the electromagnetic water treatment device, preferably, the magnetic field intensity is 2000-6000 gauss.

In the electromagnetic water treatment device, preferably, after being electrolysed outflows from an outlet of the electromagnetic water treatment device, the water outflows in any of the following ways:

way 1: water outflows respectively from the first water flow passage and the second water flow passage;

way 2: water outflows from confluence of the first water flow passage and the second water flow passage.

Generally the way of water outflow of in the electromagnetic water treatment device may be adjusted according to the actual needs of the potential of hydrogen of the plasma electrolytic water. When the neutral plasma electrolytic water is needed, the water outflows in the confluence way; and when the electrolytic acidic water or the electrolytic alkaline water is needed, the water outflows in the respective way.

The water outflowing from the first water flow passage after passing through the electromagnetic water treatment device is the electrolytic acidic water, and the electrolytic acidic water contains a lot of negative oxygen ions ($O^{2-}$, $O^{3-}$). The water outflowing from the second water flow passage is the electrolytic alkaline water In the present invention, the device of the scrubber is a common set in the art. Preferably, the scrubber comprises a tower tube, a gas inlet is disposed at the bottom of the tower tube, a gas outlet is disposed at the top of the tower tube; at least one nozzle, and at least one filler layer are disposed inside the tower tube.

Wherein, generally the number of the nozzle and the filler layer can be adjusted according to demands. Preferably, two nozzles, and three filler layers are disposed inside the tower tube, the nozzles and the filler layers are alternately disposed from the top to the bottom.

Wherein, the scrubber is used for the treatment of the exhaust gas, when it is used, generally the exhaust gas passes through the filler layers from the gas inlet from the bottom of the tower tube, and simultaneously fully contacts with the plasma electrolytic water sprayed from the nozzles in the filler layers; and finally the gas outflows from the gas outlet at the top of the tower tube; and it is ok.

Wherein, the filling height of the filler layer is common in the art, preferably 1-10 m, more preferably 2-5 m.

The present invention further provides an exhaust gas purification system comprises the above scrubber.

Wherein, preferably, the exhaust gas purification system comprises the above scrubber, an electrolysed water production device, a water tank, and a filter; the electrolysed water production device, the scrubber, the filter, and the water tank are circularly connected in turn.

Wherein, the electrolysed water production device is preferably the above electromagnetic water treatment device or the above reactor continuously generating high redox water.

The present invention further provides an air purification method using the above exhaust gas purification system for treatment of the exhaust gas.

In the present invention, the exhaust gas is the common exhaust gas in the art, usually is TVOC. TVOC is a more serious kind of three pollution affecting quality of indoor air. TVOC means an organic matter with a saturated vapor pressure of more than 133.32 pa at room temperature, the boiling point of which is at 50° C. to 250° C., it can exist in the air in the evaporate form at room temperature, its toxicity, irritation, carcinogenicity and special odor, will affect the skin and mucous membranes, acutely damage the human body, including organic sulfur compounds, nitrogen compounds, organic acids, oxygenated hydrocarbons, halide-containing compounds and other emissions. By category generally it has benzene, alkanes, aromatic hydrocarbons, alkenes, halocarbons, esters, aldehydes, ketones and the like. Preferably, the exhaust gas is xylene and/or formaldehyde; more preferably, the concentration of xylene or formaldehyde in the exhaust gas are 1 $mg/m^3$-2000 $mg/m^3$; further more preferably 10 $mg/m^3$-50 $mg/m^3$.

Wherein, the flow rate ratio of the treatment water to the exhausted gas in the scrubber is common in the art, preferably 1-3 $L/m^3$.

Wherein, the gas superficial velocity in the scrubber is common in the art, preferably 0.1-20 m/s, more preferably 0.5-1 m/s.

On the basis of compliance with the common knowledge in the art, the above preferred conditions can be any combination, i.e. preferred examples of the present invention are obtained.

The reagents and raw materials used in the present invention are commercially available.

The positive effect of the present invention is: unlike traditional scrubbers, the present scrubber and air purification system comprising the scrubber do not need to use acid or alkali additives when treating exhaust gas, and the present scrubber and air purification system comprising the scrubber have a simple exhaust gas treatment process, high efficiency, and excellent air purification capability.

BRIEF DESCRIPTION OF THE DRAWINGS

The present disclosure is described in conjunction with the appended figures.

DETAILED DESCRIPTION OF THE INVENTION

The following embodiments further illustrate the present invention, but the present invention is not limited thereto. The unspecified conditions of the experiment methods in the following embodiments are selected according to common method and condition, or according to the commodity instruction.

Embodiment 1

Figure 1:
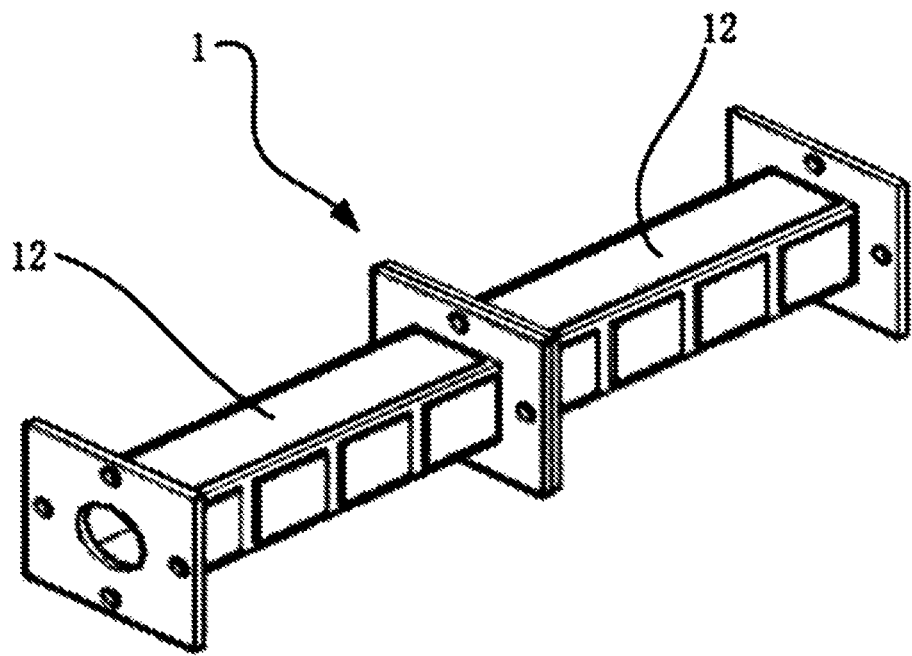
FIG. 1 is a partial structure view of the electromagnetic water treatment device producing the plasma electrolytic water in a preferred embodiment of the present invention.
Figure 2:
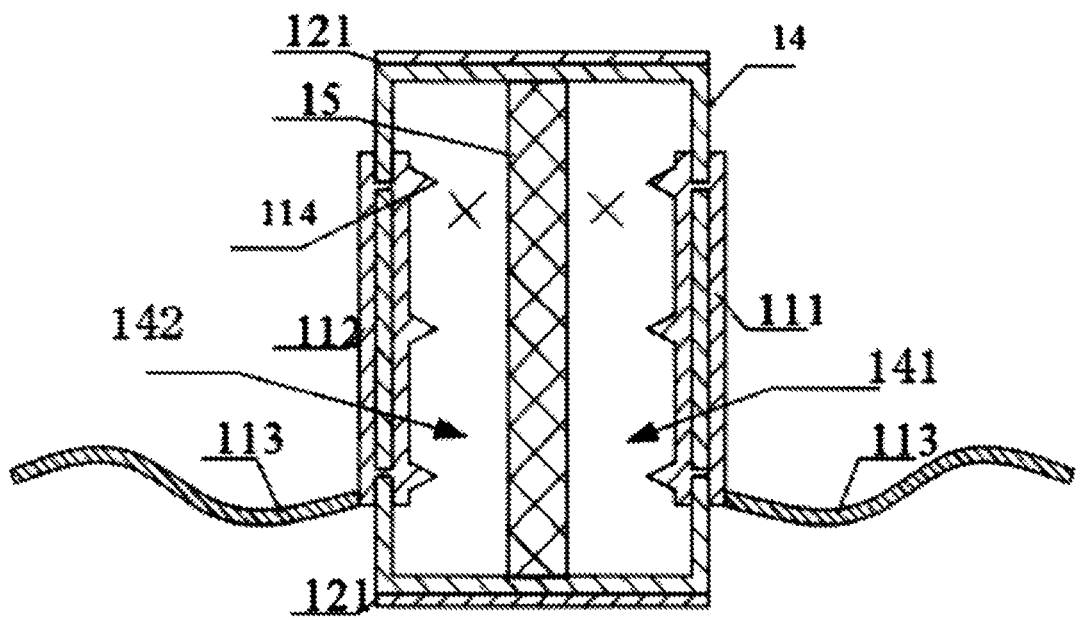
FIG. 2 is an internal structure view of the water flow passage of the electromagnetic water treatment device producing the plasma electrolytic water in a preferred embodiment of the present invention.

FIGS. 1 and 2 illustrate an electromagnetic water treatment device 1 of the present invention. The electromagnetic water treatment device 1 comprises a cation exchange film 15, a water flow passage 14, at least one positive pole panel 111 and at least one negative pole panel 112, and a magnetic device 12; the positive pole panel 111 and the negative pole panel 112 are disposed on the water flow passage, and applied an electric field, to electrolyze the solution in the water flow passage; the cation exchange film 15 is disposed inside the water flow passage 14, is located between the positive pole panel and the negative pole panel, and divides the water flow passage 14 into a first water flow passage 142 and a second water flow passage 141; the magnetic device 12 is disposed on the water flow passage, to apply a magnetic field perpendicular to the direction of the electric field in the water flow passage, and in the present embodiment, the magnetic device is a plurality of magnetic sheets 121, the strength of the magnetic field produced by the magnetic sheets is 6000 gauss. Several discharge needles 114 are distributed on the positive pole panel and the negative pole panel. The positive pole panel and the negative pole panel are respectively connected to the positive and the negative of the power supply through a wire 113. When tap water passes through the electromagnetic water treatment device, electricity is provided for electrolysis. The tap water generally contains sodium chloride, magnesium chloride and other mineral salts, according to the principle of electrolysis of water, under the effect of the cation exchange film, electrolytic acidic water will be produced nearby the positive pole panel 111, and it contains a lot of negative oxygen ions ($O^{2-}$, $O^{3-}$), having strong oxidation; electrolytic alkaline water will be produced nearby the negative pole panel 112. And in the presence of the magnetic field perpendicular to the water flow passage, water flows in the pipe, in the case of cutting the magnetic field the positive and negative ions in the water will be affected by a Lorentz force which will accelerate the movement of the positive and negative ions towards the pole panels. Taking the present embodiment as an example, according to FIG. 2, the magnetic sheets 121 upper of the water flow passage are N-pole magnetic sheets, the magnetic sheets 121 lower of the water flow passage are S-pole magnetic sheets, during the electrolysis process while moving to the negative pole panel with a large number, the cations will also move and cut the magnetic induction line along the flow direction (the flow direction is shown as "x" in FIG. 2) and affected by the Lorentz force directing to the negative pole panel 112, to accelerate the movement of the cations. Water outflows from confluence of the first water flow passage 142 and the second water flow passage 141 to obtain electrolytic neutral water; water outflows respectively from the first water flow passage 142 and the second water flow passage 141 to simultaneously obtain electrolytic acidic water and electrolytic alkaline water.

In practical applications, the disposition of positive and negative pole panels and N-pole and S-pole of the magnetic sheets, as well as the flow direction can be adjusted and coordinated in accordance with the actual situation, as long as the electrolysis and magnetic field cooperates to accelerate the movement of the ions in the water.

Embodiment 2

Figure 3:
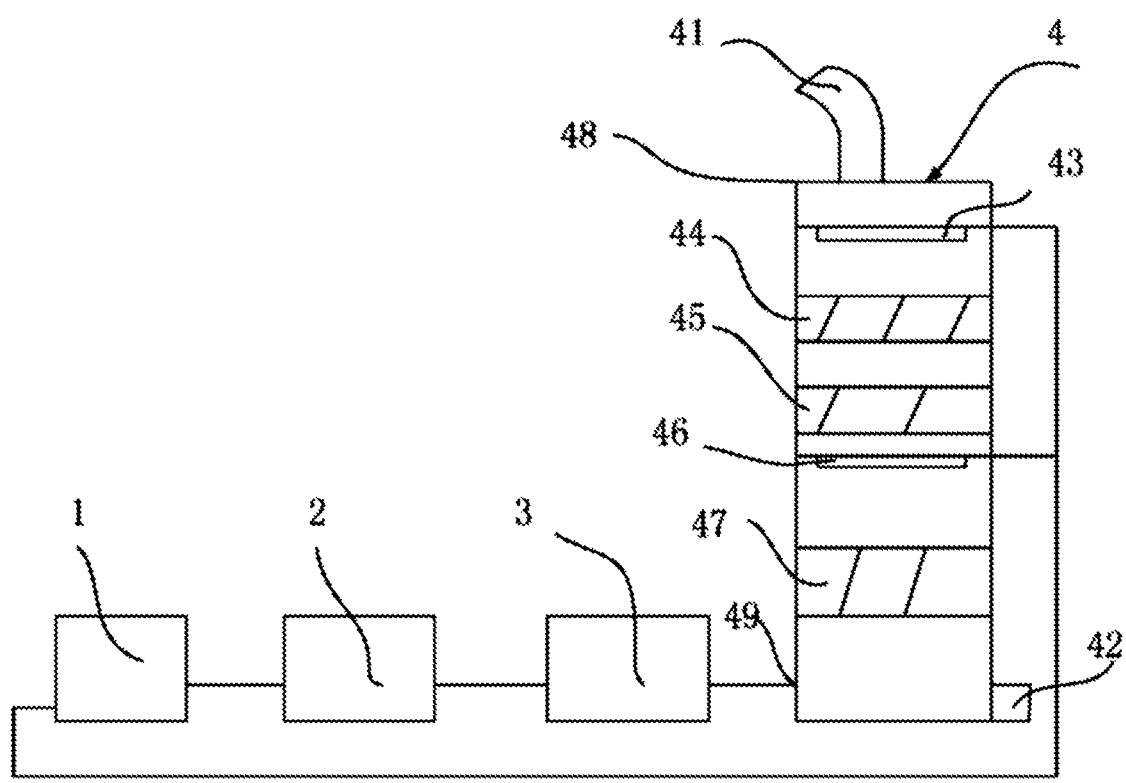
FIG. 3 is a structure view of the exhaust gas purification system in a preferred embodiment of the present invention.

As shown in FIG. 3, the present embodiment provides an exhaust gas purification system, the exhaust gas purification system comprises an electromagnetic water treatment device 1, a scrubber 4, a filter 3, and a water tank 2; the electromagnetic water treatment device 1, the scrubber 4, the filter 3, and the water tank 2 are circularly connected in turn. The scrubber 4 comprises an gas inlet 42, a tower tube 48, a gas outlet 41, and a water outlet 49; two nozzles, and three filler layers are disposed inside the tower tube 48, from the top to the bottom a first nozzle 43, a first filler layer 44, a second filler layer 45, a second nozzle 46 and a third filler layer 47 are disposed in turn.

Water from the water tank 2 enters the electromagnetic water treatment device 1 after being electrolysed to obtain plasma electrolytic water of the present invention, the plasma electrolytic water is sprayed to the first filler layer 44, the second filler layer 45 and the third filler layer 47 inside the tower tube through the first nozzle 43 and second nozzle 46, and the exhaust gas enters into the tower tube through the gas inlet 42 at the bottom of the tower tube and then passes through the third filler layer 47, the second filler layer 45 and the first filler layer 44 in turn, after the absorption of the plasma electrolytic water and decomposition reaction, the gas is expelled from the gas outlet 41 at the top of the tower tube. The plasma electrolytic water outflows from the water outlet 49 at the bottom of the tower tube, flowing through the filter 3 to filter, passing through the water tank 2 and re-entering the electromagnetic water treatment device 1, and repeating the above processes, the water of which has always been recycled. After the end of the exhaust gas treatment process, expelling the plasma electrolytic water.

Embodiment 3

The present embodiment is substantially the same as embodiment 2, except that, using a reactor continuously generating high redox water in embodiment 1 of Chinese patent application having an authorization publication No.: CN102320684B of invention patent (the content of which is incorporated herein by reference in its entirety) to replace the electromagnetic water treatment device 1 in the embodiment 2 of the present invention. The height of the filler layer in the scrubber is 2 m, and the gas superficial velocity in the scrubber is 0.5 m/s.

Embodiment 4

The present embodiment is substantially the same as embodiment 2, except that, the voltage between the positive pole and negative pole is 3000 volts DC; using a reactor continuously generating high redox water in embodiment 2 of the invention patent having an authorization publication No.: 102320684B (the content of which is incorporated herein by reference in its entirety) to replace the electromagnetic water treatment device 1 in the embodiment 2 of the present invention. The height of the filler layer in the scrubber is 5 m, and the gas superficial velocity in the scrubber is 1 m/s.

Embodiment 5

This embodiment is substantially the same as embodiment 3, except that, the voltage between the positive pole and negative pole is 100 volts DC. The oxidation-reduction potential of the produced electrolytic acidic water is 800 mv, and the oxidation-reduction potential of the electrolytic alkaline water is preferably −800 my. The height of the filler layer in the scrubber is 1 m, and the gas superficial velocity in the scrubber is 20 m/s. The flow rate ratio of the treatment water to the exhausted gas in the scrubber is 1 L/m³.

Embodiment 6

This embodiment is substantially the same as embodiment 3, except that, the voltage between the positive pole and negative pole is 5000 volts DC. The oxidation-reduction potential of the produced electrolytic acidic water is 1500 mv, and the oxidation-reduction potential of the electrolytic alkaline water is −1200 mv. The height of the filler layer in the scrubber is 10 m, and the gas superficial velocity is 0.1 m/s. The flow rate ratio of the treatment water to the exhausted gas in the scrubber is 3 L/m³.

Using the double-deck scrubber of the exhaust gas purification system in embodiment 3, the conventional absorption liquid and the plasma electrolytic water are respectively used for treating exhaust gas. Conventional absorption liquid generally may be sodium hydroxide solution, sulfuric acid solution or sodium hypochlorite solution. Conventional absorbent solution used in the present embodiment is sodium hypochlorite solution. The water amount in the double-deck scrubber is 1 ton.

10000 m³ of the exhaust gas containing xylene or formaldehyde is hourly passed into for treatment. The concentration of the xylene in the exhaust gas in table 1 is 50 mg/m³. The concentration of the formaldehyde in the exhaust gas in table 2 is 10 mg/m³. After the treatments respectively using the methods of the present invention and conventional treatment, test the concentration of the xylene or formaldehyde in the gas outlet and in the water.

The detection method of the formaldehyde in the air: spectrophotometer chemical analysis The detection method of the formaldehyde in the water: AHMT spectrophotometry of GB/T5750.10-2006 "Standard Examination Methods for Drinking Water".

The detection method of the xylene in the air: GB11737-89 gas chromatographic method The detection method of the xylene in the water: gas chromatographic method

TABLE I

Treatment of the exhaust gas containing the xylene

| | initial concentration of the gas inlet | concentration of the gas outlet after 2 hours | concentration of the gas outlet after 4 hours | concentration in the plasma electrolytic water after 2 hours | concentration in the plasma electrolytic water after 4 hours |
|---|---|---|---|---|---|
| the treatment using the plasma electrolytic water of the present invention | 50 mg/m³ | 5 mg/m³ | 4.5 mg/m³ | 1 g/m³ | 0.9 g/m³ |
| conventional treatment | 50 mg/m³ | 49 mg/m³ | 48 mg/m³ | 4 g/m³ | 4 g/m³ |

TABLE II

Treatment of the exhaust gas containing the formaldehyde

| | initial concentration of the gas inlet | concentration of the gas outlet after 2 hours | concentration of the gas outlet after 4 hours | concentration in the plasma electrolytic water after 2 hours | concentration in the plasma electrolytic water after 4 hours |
|---|---|---|---|---|---|
| the treatment using the plasma electrolytic water of the present invention | 10 mg/m³ | 0.05 mg/m³ | 0.047 mg/m³ | 0.7 mg/m³ | 0.65 mg/m³ |
| Conventional treatment | 10 mg/m³ | 0.7 mg/m³ | 0.65 mg/m³ | 190 g/m³ | 350 g/m³ |

All of embodiments 1, 2, and 4-6 can achieve the above effects.

Although the specific embodiments of the present invention are described foregoing, a person skilled in the art should understand that these are only illustrative examples, various changes or modifies can be made to these embodiments without departing from the principle and essence of the invention.

What is claimed is:
1. An exhaust gas purification system, comprising:
a scrubber, wherein treatment water of the scrubber is plasma electrolytic water prepared by electrolyzing water;
an electromagnetic water treatment device including a water flow passage, at least one positive pole panel and at least one negative pole panel disposed on opposing sections of the water flow passage, and a cation exchange film disposed within the water flow passage and located between the at least one positive pole panel and the at least one negative pole panel to thereby divide the water flow passage into a first water flow passage and a second water flow passage;

a water tank; and a filter, wherein the filter, the water tank, the electromagnetic water treatment device, and the scrubber are connected to one another;

the electromagnetic water treatment device further including a magnetic device having at least one pair of magnetic sheets adheringly disposed on two opposing outer walls of the water flow passage, whereby respective electric fields generated by the at least one positive and negative pole panels electrolyze water in the first and second water flow passages, and a magnetic field generated by the at least one pair of magnetic sheets is in a direction perpendicular to a direction of the electric fields generated by the at least one positive and negative pole panels in the first and second water flow passages thereby generating the plasma electrolytic water.

2. The exhaust gas purification system according to claim 1, wherein the electromagnetic water treatment device is configured to generate high redox water, further includes a housing, wherein the at least one positive pole panel and the at least one negative pole panel are disposed on opposing inner sides of the housing in a longitudinal direction of the housing and having acidic and alkali resistances, and the at least one positive and negative pole panels are parallel with respect to one another and are equidistant from the cation exchange film, the cation exchange film being disposed in parallel relative to the at least one positive and negative pole panels, the distance between the at least one positive pole panel and the at least one negative pole panel being 2-80 mm; a water inlet and at least one water outlet are disposed on opposing longitudinal ends of the housing, whereby water is injected into a pipe and water inflows from one of the longitudinal ends of the housing and outflows from the other one of the longitudinal ends of the housing; thereby the water inlet, the at least one negative pole panel, the cation exchange film, the at least one positive pole panel, and the at least one water outlet are disposed in the longitudinal direction of the housing, the at least one positive pole panel and the at least one negative pole panel are connected to a voltage DC power supply whereby 100-5000 VDC of DC voltage is applied between the at least one positive pole panel and the at least one negative pole panel; and the at least one positive pole panel composition is selected from the group of graphite panel, platinum coating panel, ruthenium and iridium coated titanium panel, or titanium panel.

3. The exhaust gas purification system according to claim 2, wherein the DC voltage is 3000-5000 VDC.

4. The exhaust gas purification system according to claim 1, wherein a plurality of discharge needles are positioned on the at least one positive pole panel and the at least one negative pole panel, whereby magnetic field intensity is 2000-6000 gauss; and subsequent to the water being electrolyzed to generate the plasma electrolytic water, the plasma electrolytic water outflows from at least one outlet of the electromagnetic water treatment device by either:

the plasma electrolytic water outflowing respectively from the first water flow passage and the second water flow passage; or the plasma electrolytic water outflowing from confluence of the first water flow passage and the second water flow passage.

* * * * *